United States Patent Office

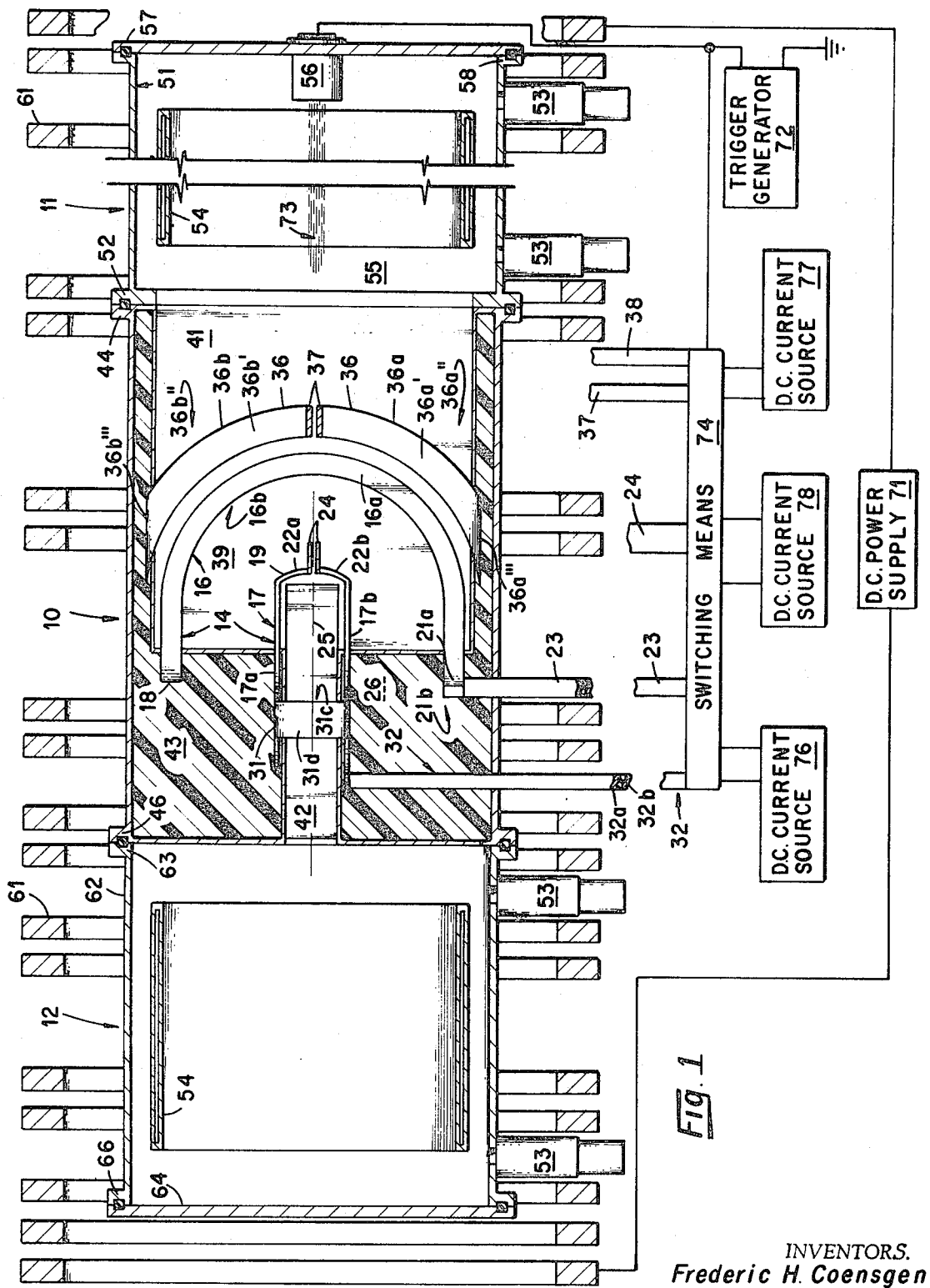

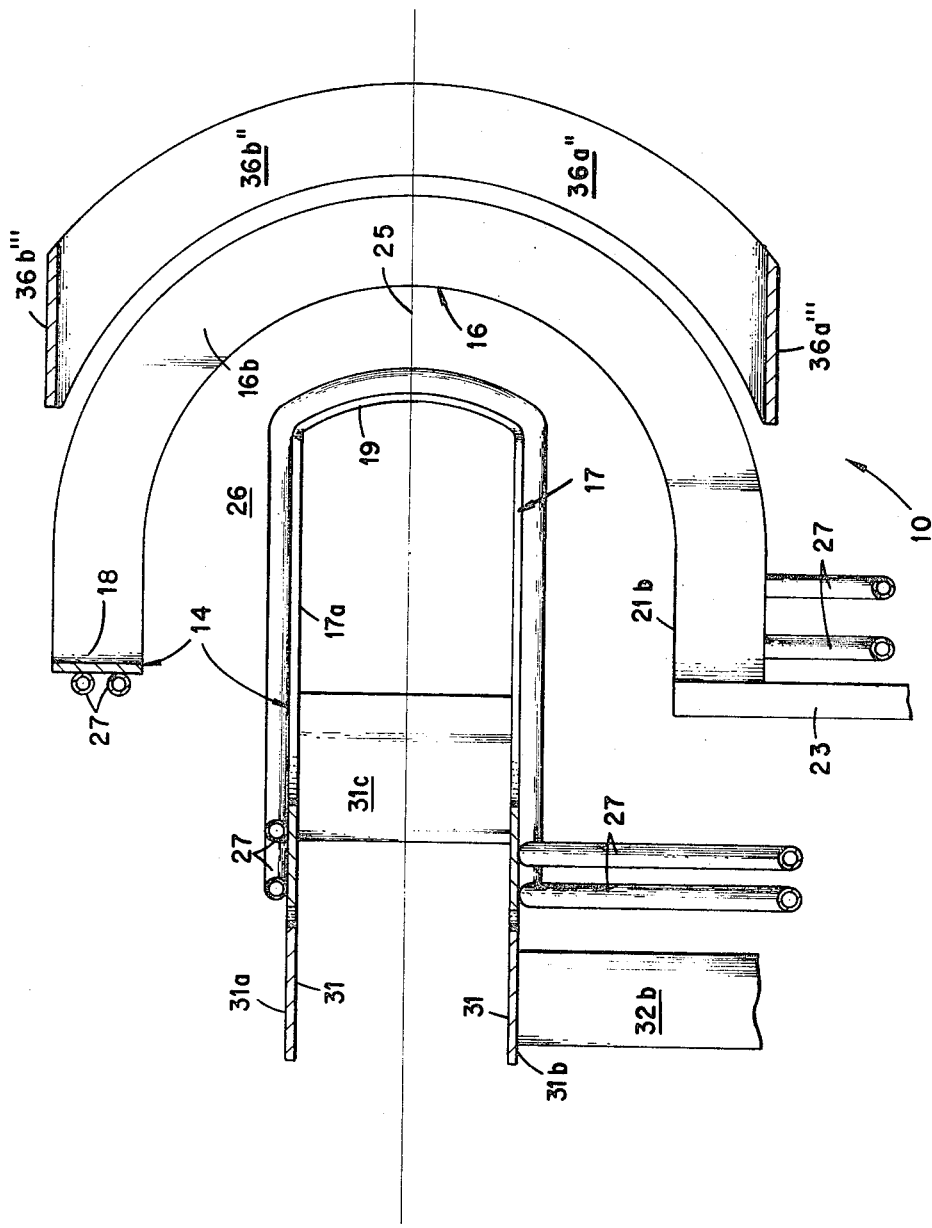

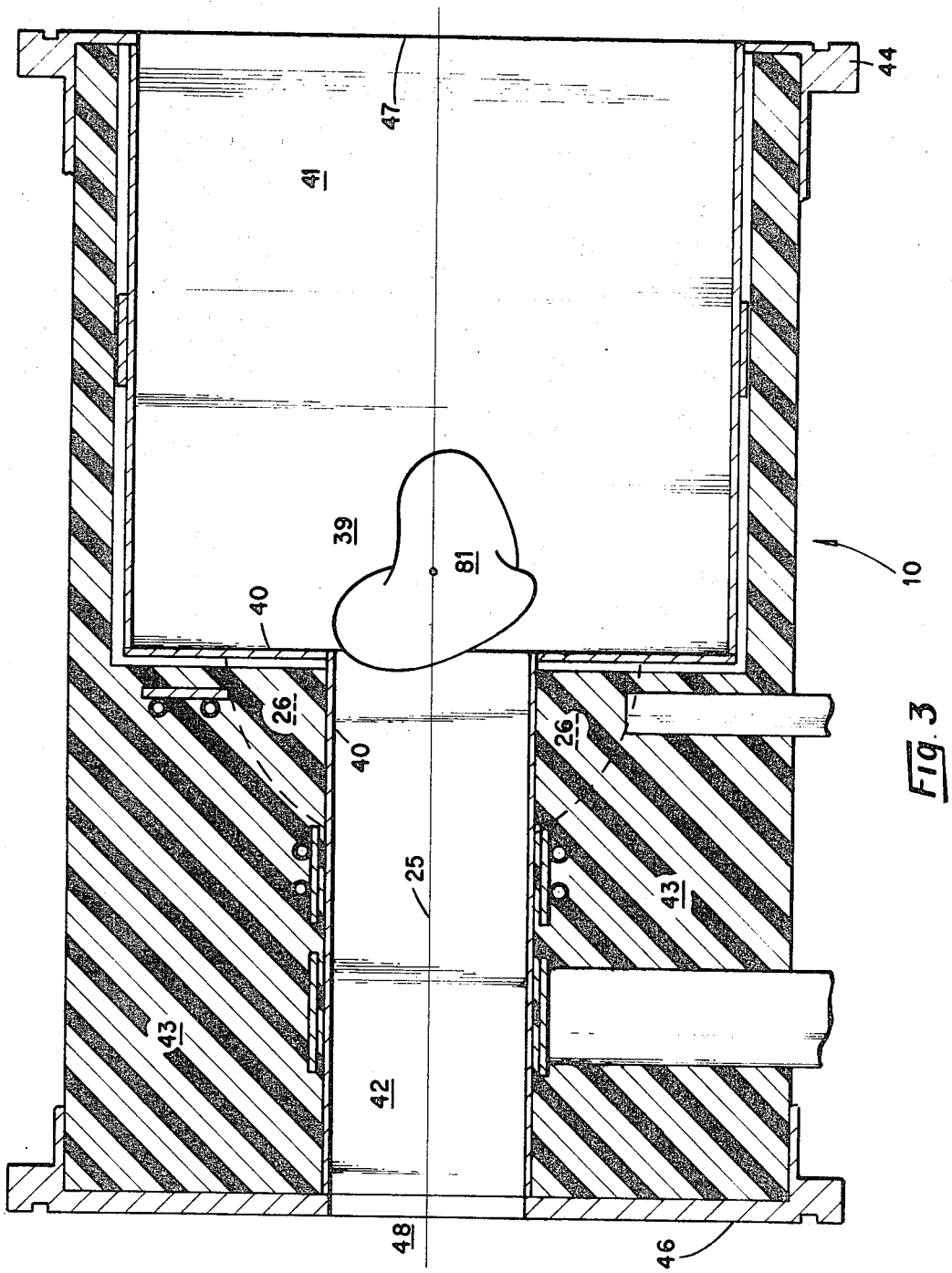

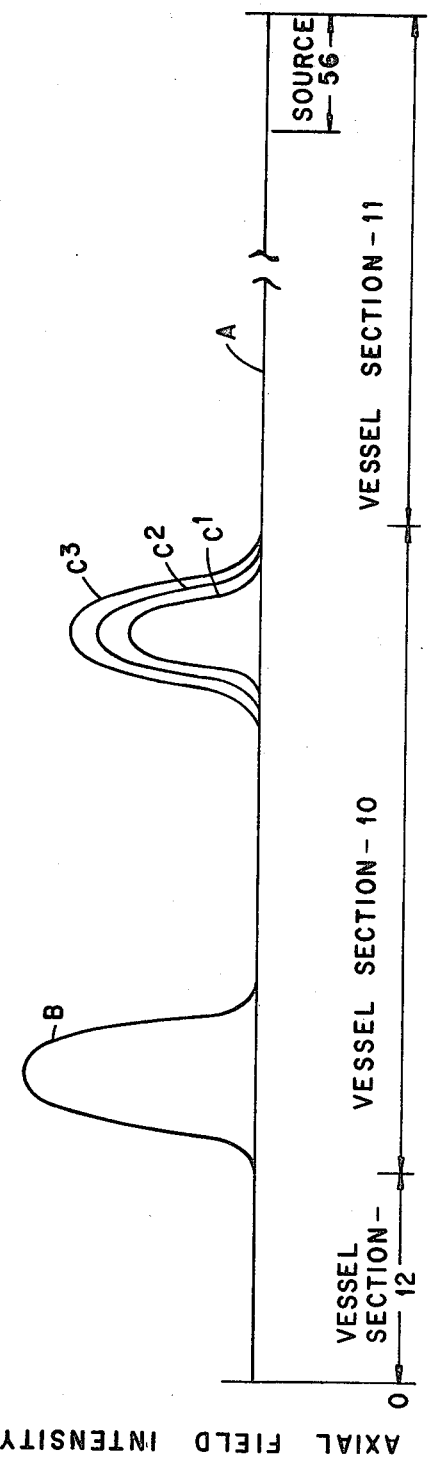

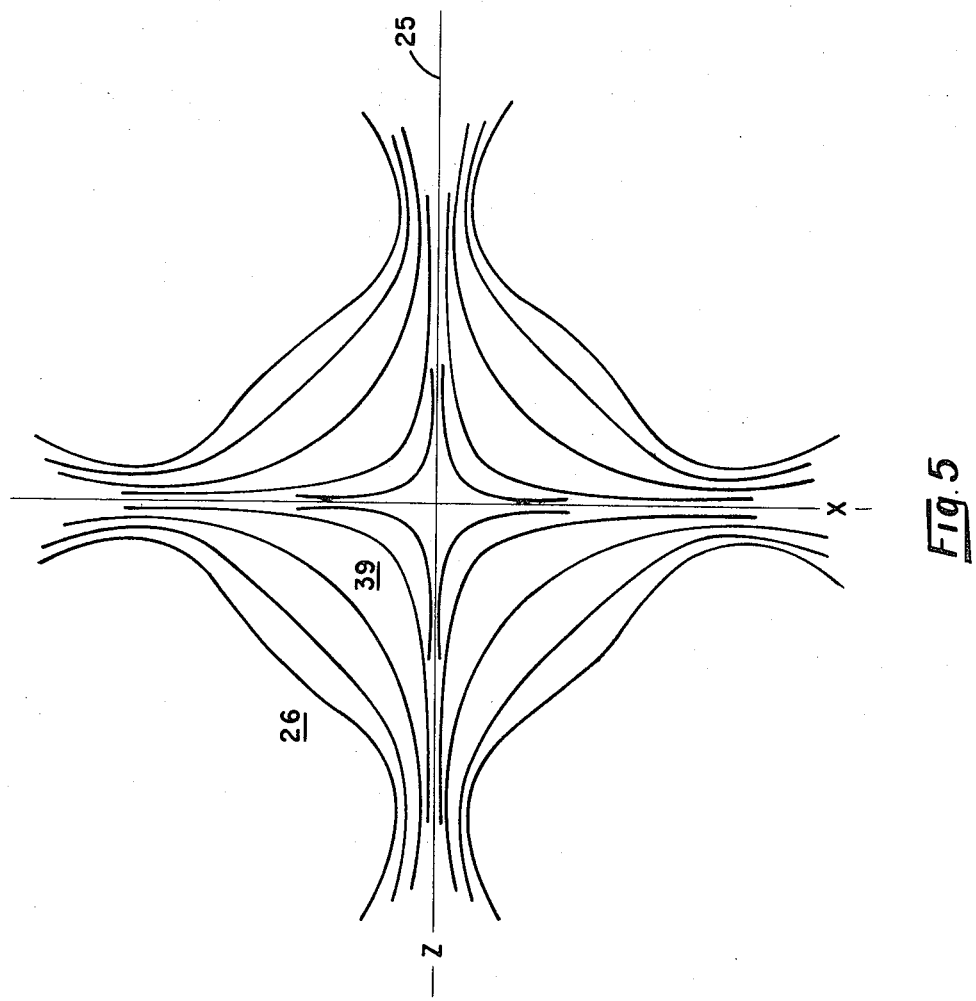

3,677,889
Patented July 18, 1972

---

3,677,889
MAGNETIC COMPRESSION CONTROLLED
THERMONUCLEAR REACTOR
Frederic H. Coensgen, Pleasanton, and William E. Nexsen, Jr., Danville, Calif., assignors to the United States of America as represented by the United States Atomic Energy Commission
Filed July 8, 1970, Ser. No. 53,056
Int. Cl. G21b 1/00
U.S. Cl. 176—3    9 Claims

ABSTRACT OF THE DISCLOSURE

Thermonuclear reactor utilizing a magnetic coil structure including a pair of intermeshed C-shaped electromagnetic coils (Yin-Yang configuration) to produce a magnetic confinement zone. Plasma is produced in a pulsed plasma source and is directed by magnetic fields into the region of said containment zone. A trapping field is produced by means of a second pair of C-shaped electromagnet coils encompassing the first set to trap plasma in said region. The first set of coils is then energized to contain and compress the trapped plasma thereby densifying and heating the plasma to a high temperature.

BACKGROUND OF THE INVENTION

The invention described herein was conceived or made under Contract No. W-7405-ENG-48 with the United States Atomic Energy Commission.

Single stage magnetic compression of controlled fusion reaction plasmas is disclosed in Paper No. 378, vol. 32, by F. H. Coensgen et al., proceedings of the Second United Nations International Conference on the Peaceful Uses of Atomic Energy. Multistage compression of plasmas, i.e., deuterium plasma is described in an article by F. H. Coensgen, W. F. Cummins, W. E. Nexsen, Jr. and A. E. Sherman, p. 520 Phys. Rev. Letter, 5, 1960. A further discussion by F. H. Coensgen et al., entitled "Production and Containment of Hot Deuterium Plasmas in Multistage Magnetic Compression Experiments" appeared in "Nuclear Fusion," 1962, Supplement Part I. Multistage magnetic compression devices are also disclosed in U.S. Pat. No. 3,069,344 issued Dec. 18, 1962 to Richard F. Post and F. H. Coensgen. See also "Decay Modes of a Dense Plasma in a Magnetic Well," F. H. Coensgen et al., "Plasma Physics and Controlled Nuclear Fusion Research," pp. 225–238, vol. 21, International Atomic Energy Agency, Vienna, 1969.

In the earlier single stage magnetic compression devices a burst of relatively cold plasma was compressed in a rapidly rising magnetic mirror field, i.e., an axial field having terminal intensified field regions adjoining a linear field region of lesser intensity defining a containment zone therebetween. In the multistage devices mentioned above, a burst of plasma was compressed by transfer through a succession of simple magnetic mirror containment zones of progressively increased pulse magnetic field intensity. Device of the foregoing natures have been termed "Toy Top" and "2X." While rather encouraging results toward obtaining production and containment of high temperature plasma have been attained with these prior magnetic mirror type magnetic compression devices, instabilities and other problems have often limited containment times, temperatures and densities attainable therewith.

In the co-pending application of Richard F. Post and Ralph W. Moir, entitled "Electromagnetic Apparatus for Producing and Containing High Temperature Plasma," Ser. No. 881,787, filed Dec. 3, 1969, now U.S. Pat No. 3,582,849, issued June 1, 1971, there is disclosed a field coil structure having superior properties for stably containing a high temperature plasma, e.g., for use in controlled fusion reactors. Such field coil structure, termed a "Yin-Yang coil" comprises a pair of intermeshed generally C-shaped field coil segments which produce a quadrupole magnetic field defining a generally spheroidal plasma containment zone. In the aforesaid patent application the Yin-Yang coil structure is described in a form specifically adapted for continuous operation utilizing a substantially static magnetic field intensity. Excited state energetic neutral particles, e.g., $H^*$, $D^*$ $T^*$, $He_3^*$, etc., are injected as a continuous beam into the magnetic confinement zone to be ionized by Lorentz forces and trapped to form a plasma. The Yin-Yang coil configuration described therein is of a realtively long time constant type not particularly suited for use in trapping and compressing plasma produced in large volume bursts as in the case of the magnetic compression devices mentioned above.

SUMMARY OF THE INVENTION

The present invention relates generally to the production and containment of dense high temperature plasma by magnetic compression of relatively cool low density plasma and, more particularly, to apparatus utilizing Yin-Yang magnetic field coils especially adapted for the multistage trapping and compression of low temperature plasma to produce dense high temperature plasmas such as those employed in controlled fusion reactors.

More particularly, the electromagnetic field coil structure which is utilized to create the magnetic compression fields comprises a pair of generally C-shaped electromagnetic coil sections arranged in a mirror image relation rotated 90° with respect to each other and intermeshed in the aforesaid Yin-Yang configuration. With such a configuration the coil sections encompass a generally spherical center region in which a magnetic containment zone is established. However, in order to accomplish the present purposes the coil sections are constructed to provide a low inductance, low resistance current path so that relatively fast rise times of the magnetic field necessary for attaining adiabatic compression of a plasma may be achieved.

Means are provided for generating a copious quantity of relatively cool but essentially completely ionized plasma and for directing the cool plasma from one entrance side into the central region defined by the compression coil system. To provide for trapping of the cool plasma in the region of said containment zone one member of a pair of arcuate trapping or gating coils is arranged coextensively externally with respect to each one of said C-shaped coil segments. The one of said trapping coils located oppositely to the side from which the plasma is energized to reflect emergent plasma back into said central region. The second gating coil is the energized to trap the plasma in said central region in a magnetic field containment zone of relatively low magnetic field intensity and located in said central region. This trapping field is hydromagnetically stable so that loss of plasma from the trapping field is minimized. The compression coils are then energized to produce a rapidly rising magnetic field defining a mangetic containment zone encompassing the plasma trapped in the low intensity containment zone so as to adiabatically compress the cold plasma. The adiabatic compression of the cold plasma results in densifying and heating of the plasma to a high temperature which dense heated plasma may then be retained for appreciable periods of time in the containment field. These effects may be utilized to advantage for effecting the densification and heating of low atomic number nuclide plasmas in controlled fusion reactors.

Accordingly it is an object of the invention to provide an improved magnetic compression plasma device.

Another object of the invention is to provide an improved magnetic compression device for stably trapping a charge of low temperature plasma and for densifying and heating the trapped plasma to high temperatures.

Still another object of the invention is to provide a controlled fusion device in which densifiaction and heating of a light nuclide plasma is achieved by magnetic compression applied by means of magnetic field coils arranged in a Yin-Yang configuration.

Other objects and advantageous features of the invention will become apparent upon consideration of the following specification and accompanying drawing of which:

FIG. 1 is a longitudinal sectional view of a controlled thermo-nuclear reactor constructed in accordance with the invention and comprising a plasma trapping and compression section 10, a plasma injection section 11, and a vacuum pumping experimental instrumentation section 12;

FIG. 2 is an enlarged view of the Yin-Yang electromagnetic coils of the reactor of FIG. 1 taken along the vertical median longitudinal plane of reactor section 10;

FIG. 3 is an enlarged cross sectional view of the reactor of FIG. 1 taken along the vertical median longitudinal plane thereof and illustrating details of the vacuum vessel of reactor section 10;

FIG. 4 is a graphical illustration of the intensity and distribution of magnetic fields along the axis as utilized in various stages of the operation of the reactor of FIG. 1; and FIG. 5 is an illustration of magnetic field lines produced by the magnetic compression field coils of reactor section 10 projected onto the median plane between sectors of an electromagnet coil segment shown in FIGS. 1 and 2.

It is generally understood that fusion of certain light nuclides, e.g., D, T, He$_3$ and mixtures thereof will occur at appreciable rates when appropriate densities of such materials are contained at highly elevated temperatures for a sufficient period of time. For example with deuterium or a mixture of deuterium and tritium as a fuel and provided as a high temperature plasma, i.e., an electrically neutral mixture of ions and electrons, ion temperatures of the order of $10^4$ to $10^5$ electrons volts and densities of the order of $10^{15}$ particles/cc. for periods of the order of tenths of seconds are required to provide substantial power output. The foregoing factors are interrelated and an increase in one may permit a decrease in another. For example, with increased densities the containment time can be shorter, etc. However, for other purposes, e.g., in laboratory devices, plasma densities may range from $10^{12}$ to $10^{17}$ particles/cc., with ionic temperatures ranging upwardly from a few kev. to several hundred thousand kev. and with containment times in the microsecond to millisecond range.

One approach to attaining high temperature is by the adiabatic compression of a cold plasma of any desired composition by successive application of magnetic fields of increasing intensity. The theory of magnetic compression may be derived on the basis of the adiabatic theory as described, inter alia, in the Nuclear Fusion: 1962 Supplement Part I reference cited above. To approximate adiabatic heating condition the magnetic field must be increased to a high value in a time which is short compared to the ion-ion relaxation time but which is long with respect to the ion cyclotron period. Under these conditions, the charged plasma particles (ions) gain energy, E, in proportion to their initial rotational energy, W⊥, and the ratio, $\alpha$, of the final to initial field values, i.e., $\alpha = B_F/B_O$ whenceforth $E_F = \alpha E_O$. In a cylindrical system the diameter of the plasma decreases as $\alpha^{1/2}$.

DESCRIPTION OF AN EMBODIMENT

Considering now details of the invention with reference to the form illustrated in the drawing. A high temperature plasma device or controlled thermonuclear reactor, as shown in FIG. 1 may comprise a central section 10 in which trapping and compression of a cold plasma is effected. The reactor also includes a first terminal section in which the cold plasma is generated to be directed into section 10 and a second terminal section 12 adapted to provide high speed evacuation of the vacuum system of section 10 and provide space for conducting experiments, etc. Generally, the sections 10, 11 and 12 are arranged in axial alignment and constitute a single interconnected vacuum system.

More particularly, an electromagnetic coil structure 14 especially adapted to accomplish magnetic compression of a plasma in reactor section 10 includes a pair of coil segments 16 and 17, as shown in FIGS. 1 and 2 of the drawing. The segments 16, 17 are of a generally similar C-shape as seen in a side view. To provide for the fast rise times required for magnetic compression the reactance and resistance of segments 16, 17 must be made low, i.e., constructed with low resistance conductors and few effective turns. In the form illustrated the segments 16, 17 are constructed of a single turn rectangular bar conductor. The segments 16, 17 each include a pair of spaced parallel generally annular arcuate C-shaped sectors 16a, 16b and 17a, 17b, respectively. Corresponding open ends of sectors 16a, 16b and 17a, 17b, are joined by transverse curved conductor portions 18 and 19, respectively. The other corresponding ends of sectors 16a, 16b and 17a, 17b may be provided with end portions 21a, 21b and 22a, 22b, respectively, curved toward the median plane therebetween. Double conductor transmission lines, 23 and 24, are attached respectively, to the open ends of end portions 21a, 21b and 22a, 22b, to provide for application of energizing current to said coil segments. While the conductors of segments 16 and 17 are shown as single turn bars, multiple parallel single turn conductors may likewise be employed.

The segments 16 and 17 are arranged in mirror image relation rotated 90° with respect to an axis of symmetry 25 defined as the line of intersection of the median planes between said parallel pairs of sectors 16a, 16b and 17a, 17b, respectively, which median planes are also planes of symmetry which bisect the arcuate sectors of the respective other coil segment. With this arrangement the segments encompass a central generally spherical or spheroidal space 26, i.e., the inner edges of said segment lie in a common generally spherical or spheroidal surface. Moreover, the C-shaped lobe sectors 16a, 16b and 17a, 17b, define therebetween generally rectangular spaces communicating with said central spheroidal space 26 and extending outwardly beyond the coil sections 16, 17. To provide for cooling, a conduit 27 may be attached by brazing, etc., to the side surfaces of said sectors, as shown in FIG. 2, through which a conduit coolant such as a heat exchange fluid, liquid N$_2$, etc., may be passed from an exterior source (not shown).

The electromagnet coil structure 14 is generally arranged with the axis of symmetry 25 aligned with the axis of reactor section 11 to permit injection of plasma therefrom through the space between sectors 16a, 16b into space 26 as described more fully hereinafter. Means for trapping such a plasma in space 26 includes a generally rectangular cross section arcuate electromagnetic trapping coil 31 arranged symmetrically about the generally rectangular space extending axially between arcuate sectors 17a, 17b, of coil segment 17 into reactor section 12. It is generally preferred, for convenience, that coil 31 have a relatively fast rise time e.g., 50–500 microseconds while rise times of about 200 to 500 microseconds typically suffice. Coil 31 may be constructed with arcuate sectors 31a, 31b, shown in FIG. 2, disposed circumjacent coil sectors 17a, 17b, respectively. Transverse sections 31c, 31d join corresponding ends of sector 31a, 31b. A fast rise time may be achieved by paralleling a number of single turn conductors. The ends thereof may be joined in parallel, e.g., along the mid plane of sector 31b. A transmission line 32 comprising double conductors 32a, 32b, separated by insulation may then be connected to the parallel joined ends of the multifilar single turn coil 31 for energization, as described below, to generate a magnetic field effective to reflect plasma back into space 26.

Such means for trapping plasma in space 26 also includes a second generally rectangular cross section arcuate electromagnet gating coil 36 arranged symmetrically about the space extending axially from between the arcuate sectors 16a, 16b of coil 16. It is preferred that coil 36 be adapted to a very rapid rise time, i.e., at least about 10 microseconds to about 20 microseconds to facilitate trapping of plasma retained or reflected into space 26 by coil 31. To provide for such a fast rise time the coil 36 may be constructed as two half turn multifilar conductor segments, 36a, 36b, each including parallel arcuate sections 36a', 36a'' and 36b', 36b'', respectively extending from near the center line to the peripheral height of coil structure 14. The outer ends of coil sections 36a', 36a'' and 36b' and 36b'' are joined by transverse conductor sections 36a''', 36b''' as above. At the abutting ends of segments 36a, 36b the conductors of sectors 36a', 36b' are connected to a transmission line 37 (FIG. 1) and the abutting ends of sections 36a'', 36b'' are connected to a transmission line 38. To provide for flexibility of operation the paralleled half-turn coil sections may be provided as several insulated separate coextensive conductor sections which may be energized individually, simultaneously or sequentially in stages for various purposes as noted hereinafter.

At least central portions of the space 26 defining a zone 39 in which the plasma is to be trapped and compressed must be adapted to be evacuated. A vacuum vessel 40 for this purpose may be provided in the form of two generally rectangular box-like sections 41, 42 inserted between the spaced parallel arcute sector portions of coil segments 16 and 17 in overlapping intersecting relation and being hermetically joined along the lines of intersection. The vacuum vessel must be constructed of a nonconductor such as a ceramic, e.g. Pyroceram, glazed porcelain, fused quartz, plastic suitable for high vacuum use or the like. This requirement is essential to avoid eddy current losses and shielding effects which would be caused in conductive materials, by the rapidly changing magnetic field used herein. A non-magnetic nonconductive means is also required for positioning the coil segments and for providing a "rough" vacuum vessel enclosure surrounding vacuum vessel 40 to eliminate the atmospheric pressure load on the vacuum vessel. Such means is conveniently provided as a casing 43 comprising a molded reinforced plastic composite. Epoxy and similar resins intermixed with inorganic fillers, i.e., fiber glass, silica, alumina or the like may be used. In forming casing 43 removable forms, e.g., plywood, wood, etc., covered with parting medium, e.g., thin thermoplastic polyester film (Mylar) applied thereover may be used. The various conductor segments may first be encased in a fiber glass-setting or laminating resin coating or other laminating material and placed in position on said forms. Then a viscous or putty-like mixture of chopped fiber glass, mineral filler or the like and a setting resin, e.g., epoxy, polyester or other catalyzed setting resin may be applied and built up to construct casing 43 in a generally cylindrical form with the various coil portions securely embedded therein. The casing 43 includes flange end members 44 and 46 defining, respectively, an inlet rectangular opening 47 through which vessel portion 41 is inserted and an exit rectangular opening 48 through which vessel portion 42 is inserted. The casing 43 is slightly spaced from vessel members 41, 42 and is hollowed out to define the periphery of region 26 so as to provide an intercommunicating space surrounding the vessel. This interconnected space may be evacuated to a "rough" vacuum level, e.g., down to about $10^{-5}$ to $10^{-6}$ mm. Hg by providing a vacuum conduit communicating at one end therewith through casing 43 and connecting at the other end vacuum pump means (not shown) thereto in a manner well-known in the art. Instrumentation such as neutron detectors (not shown) may be positioned in said hollowed out portion of casing 43, to detect reactions occurring in the central region. Such a casing 43 also rigidly supports the various coil segments securely in position and accommodates the strong disruptive forces generated by the various magnetic fields.

Termnial section 11 of said reactor may comprise a cylindrical non-magnetic metallic vacuum vessel section 51 disposed coaxially with respect to reactor section 10, i.e., coaxially with respect to axis 25. Vessel section 51 is attached by means of a flange 52 in sealed relation to flange 44 of casing 43. High speed vacuum pumps 53 are connected to vessel section 51 to evacuate the chamber 55 therein to a very low vacuum, e.g., preferably $10^{-8}$ to $10^{-10}$ torr or lower concurrently evacuating the chamber defined by vacuum vessel 40 through inlet opening 47. A cryogenic vacuum wall may be provided in vessel section 51 in the form of a cylindrical annular liner vessel 54 disposed coaxially therein through which a cryogenic coolant such as liquid $N_2$ can be circulated, by means, not shown, to assist in attaining and maintaining such a high vacuum.

Copious quantities of a relatively cool plasma, e.g. hydrogen, heavy hydrogen isotope, or other light nuclide plasma, may be generated by means of an ion or plasma source assembly 56 mounted, in axial alignment, centrally in end cover plate 57 attached in sealed relation to the outer end flange 58 of vessel section 51. The plasma sources of assembly 56 may comprise one or more, e.g., up to seven, of the metallic deuteride, e.g., titanium disk or washer deuteride type sources described in references cited above as well as in a paper entitled "Decay Modes of a Dense Plasma in a Magnetic Well," Coensgen et al., pp. 225–237, "Plasma Physics and Controlled Nuclear Fission Research," vol. II, International Atomic Energy Agency, Vienna, 1969. Alternatively, a single such source (not shown) may be mounted or an elongated probe inserted axially within vessel section 51, i.e., in alignment with axis 25 of the electromagnetic field coil structure 17. Other equivalent sources capable of producing large volumes of plasma may also be used. Plasma generated by such a source is constrained to a path proximate the axis and is guided therealong by means of low intensity magnetic field generated by a series of serially connected magnetic field coils 61. The field coils 61 are arranged coaxially about axis 25 of vessel section 51 and electromagnet structure of reactor section 10. A plasma charge is thereby created and guided to enter zone 39 defined by the compression and trapping coils.

As employed in usual practice a second terminal section, i.e., section 12 is attached, in sealed relation, to flange 46 of casing 43. Terminal section 12, may be similar in construction to reactor section 11 and include a cylindrical section 62, coaxially disposed about axis 25 and having a flange 63 attached to said flange 46. An end cover plate 64 is affixed in sealed relation to flange 66. As above, vacuum pumps 53 and a cryogenically cooled liner vessel 54 are provided within and coils 61 are coaxially disposed about the cylindrical section 62. It is preferred that the magnetic guide field and the magnetic fields produced by the compression coils at least, be tailored so that the magnetic field guiding centers terminate in the end tank regions 11 and 12 rather than in section 10 so that gaseous material produced by bombardment of vessel walls by escaping plasma particles will occur in the end tank regions and not in the reactor section. Contamination of the plasma is thereby minimized.

In operation of the foregoing reactor the interconnected vessel system is first evacuated to a pressure below about $10^{-8}$ torr and preferably to pressures approaching $10^{-10}$ torr. This is done using usual bakeout and other conventional procedures by means of the evacuation means described above. For the lower vacuum pressures titanium may be evaporated in the system as a "gettering" material as disclosed by J. N. Doggett and G. E.

Vagtlin, "Selection of a Getter Material and Made of Operation," Proc. 1966 Symp. on Engr. Problems of CTR, ORNL October 3–6 (1966). Liquid nitrogen is introduced into the liner vessels 54 to assist in evacuation and to remove extraneous materials evolved during operation.

Operation to produce a heated plasma is begun by applying current from a D.C. power supply 71 to guide coils 61 to create an axially symmetric magnetic guide field of substantially uniform intensity in reactor sections 11, 10 and 12 corresponding to curve A of FIG. 4. The guide field may have an intensity in the range of about 1000 to about 3000 gauss. A field of about 2 kilogauss is usually adequate. A trigger pulse signal generated, for example, by trigger generator 72, is applied to the plasma sources of assembly 56 to cause the emission of a copious quantity of plasma 73 which is guided axially through vessel section 51 of reactor portion 11. For example, if titanium deuteride sources are employed the emitted plasma comprises a high proportion of deuterons (D ions), titanium ions, evaporated titanium metal and other materials. It will be appreciated that the quantity of plasma produced must be adequate so that after compression the desired density in the containment zone is achieved. The temperature, i.e., kinetic energy of the deuterons emitted by the plasma sources may range from a few electron volts to several kev. To facilitate production of a plasma having a temperature appropriate to attain a substantial fusion reaction rate, the plasma should contain a substantial proportion of deuterons having an energy in the range of at least about 500 ev. to above about 3 kev. dependent on the compression ratio to be utilized. It will be appreciated that the higher the injected plasma temperature the less compression required to achieve a set plasma temperature or with equivalent compression the higher the final temperature. As the plasma 73 streams axially along reactor section 11 the more energetic deuterons tend to travel ahead of the slower moving, less energetic deuterons as well as the slower moving heavier titanium ions and other slower moving components emitted by the plasma sources. Accordingly a plasma fraction mainly comprising the higher energy deuterons devoid of titanium and other impurities appears at the forefront of the streaming plasma.

In usual practice, a trigger pulse from generator 72 is simultaneously applied to sequential switching means 74 to switch a current pulse from a D.C. current source 76 to transmission line 32 to energize trapping coil 31. Coil 31 thereby creates a magnetic field of increasing intensity superimposed on the axial guide field in the extit region of zone 39 providing a gradientially intensified magnetic field region thereat corresponding to curve B of FIG. 4. It is of course possible to energize coil 31 prior to triggering of the plasma sources or slightly thereafter so long as the reflecting field is present when the plasma arrives. Such gradientially intensified field region effectively creates a magnetic mirror which returns plasma fractions streaming through region 26 back through the containment zone 39 with some attendant delay so that plasma of significant density is present in the containment zone at least momentarily. At this time trapping coil 36 is energized to produce a very fast rising magnetic mirror field at the entrance of the region 39 to retain the purer higher temperature deuteron plasma therein. This magnetic field corresponds to curves $C^1$, $C^2$, $C^3$ as shown in FIG. 4.

More specifically, switching means 74 is provided with a second switching arrangement which is actuated after an appropriate delay time to apply a current pulse from a second D.C. current source 77 to transmission lines 37, 38 so as to energize coil 36 to produce a rising intensity magnetic mirror field at the entrance to zone 39. Such field is effective to reflect the plasma returned by coil 31 back into zone 39 so that the plasma is effectively trapped therein. It may be noted that the magnetic field pattern created by superposition of the foregoing magnetic mirror fields at spaced positions on the aforesaid axial guiding field as represented by axial field intensities would resemble an ordinary magnetic mirror field. However, the arcuate curvature of the coils 31 and 36 create instead, in the aggregate, with the axial field therebetween, a minimum B type trapping field which is much more adapted to stable confinement of the trapped plasma.

The D.C. current sources used herein may be any such source which is capable of supplying current flow of the high peak current magnitude necessary to provide magnetic fields of the intensity indicated. As in conventional practice capacitor banks which are charged with D.C. rectifier or other power source between cycles are generally used. When switched to discharge through the various coils the current rises in the usual sinusoidal fashion determined by the $L/R$ (inductance to resistance ratio) constant of the circuit. However as used herein the switching means includes circuitry, e.g., thyratrons or the like, which short circuit, i.e., "crow-bar" the inductance so that reversal discharge proceeds in an extended exponential fashion extending the time of existence of the magnetic field as in well known conventional practice.

While the trapping coils are shown as occupying an angular arc restricted to substantially the maximum width of coil segments 16 and 17 it may be noted that such coils 31 and 36 could be extended substantially coextensive with coil segments 16 and 17, i.e., to at least a 180° arc or to enscribe a lesser arc, i.e., down to about 90°. Coils having arcuate sections of about 100° to at least about 180° may generally be found satisfactory. As noted above, coil 36 may be provided as a divided coil having, e.g., three segments individually energizable by separate conductor in transmission lines 37, 38 from current source 77. There might then be created alone or sequentially anyone of three different magnetic trapping fields represented, e.g., by curves $C^1$, $C^2$, $C^3$ of FIG. 4. Moreover such fields may be superimposed simultaneously or sequentially if desired. Variation of the fields in such a manner may facilitate trapping of selected portions of the plasma stream. In usual practice field region B is made of higher intensity than region C for most effective trapping. Moreover the magnetic mirror ratio, R, which serves as a measure of the plasma reflection or retention capability of such fields is equivalent to the ratio of either of such fields to the axial field intensity (curve A) all in accordance with theory set forth in the "Nuclear Fusion: 1962 Supplement" reference cited above.

In usual practice energization of the trapping or gating coil 31 is initiated simultaneously with or some 20 to 50 microseconds after the ion sources 56 are fired dependent on machine dimensions, time of flight of the plasma and fraction of the plasma which is to be trapped. The trapping coil 31a and associated circuitry is generally designed with a rise time, i.e., $L/R$ time constant, in the range of about 200 to 500 microseconds ($\alpha$=inductance and R=resistance). Flow of plasma into the zone between magnetic field regions B and C is not cut off immediately since ions having higher axial components of energy and favorable angles of injection can penetrate field C at lower levels to be reflected by the higher intensity field B. Upon return to field C, which has in the interim increased still further in intensity, the later arriving ions are reflected and trapped. In this manner a favorable gating and sorting out of higher energy fuel ions is accomplished while lower energy and later arriving impurities, e.g., titanium ions are excluded. A relatively pure deuterium plasma with a mean energy, i.e., kinetic temperature, somewhat higher than that of the total plasma produced by the plasma source 56 is accordingly trapped in zone 39. Moreover, the initial plasma density contained for example with radial field intensities of moderate intensity, e.g. 1.5 to about 5 kilogauss may be considered to represent a partially compressed relatively cool plasma disposed in a compact volume in zone 39 and adapted to be efficiently and economically compressed by application of a magnetic field as described hereinafter. At this stage a typical ccontrolled fusion plasma, i.e., D+ or D+, T+ mixtures, might have a density of $1 \times 10^{13}$ ions/cc. to about $3 \times 10^{13}$ ions/cc. with a mean energy of about 1000 to about 5000 kev.

EXAMPLE

A laboratory device, designated 2XII, somewhat comparable to the 2X device disclosed in the 1969 "Plasma Physics and Controlled Nuclear Fusion Research" reference cited above may have the following parameters:

TABLE I.—COMPARISON OF 2XII AND 2X

| Quantity | 2X (2 kg. base) | 2XII (2 kg. base) | 2XII (4 kg. base) |
|---|---|---|---|
| Central magnetic field (kg.) | 13.2 | 12.4 | 14.5. |
| Longitudinal mirror ratio | 1.33 | 2.1 | 1.9. |
| Radial well depth, percent $\frac{B_e - B_o^*}{B_o}$ | 2.5 | 21 | 16. |
| Plasma length (cm.) | 160 | ≈100 | ≈100. |
| Plasma diameter (FWHM) cm | 6 | 10.5 | 15. |
| Compression ratio | 7.0 | 6.2 | 3.6. |
| Rise time (μs.) | 160 | 210 | 210. |
| B field decay time, room temperature (ms.) | 5 | >30 | >30. |
| B field decay time, LN₂ temperature (ms.) | | >150 | >150. |
| Minimum distance along field line from plasma to wall (cm.) | 30 | >300 | >300. |
| Initial plasma density | $1-3 \times 10^{13}$ ions/cc | $1-3 \times 10^{13}$ ions | 1-3 ions/cc. |
| Final plasma density | $5 \times 10^{13}$ ions/cc | $5 \times 10^{13}$ ions/cc | $5-10 \times 10^{13}$ ions/cc. |
| Initial plasma temp | Up to about 3 kev | Up to at least 3 kev | Up to at least 3 kev. |
| Final plasma temp | 8 kev | 8 kev. or higher | 8 kev. or higher. |
| B, percent | 10 | 10 | 10. |

\* $B_o$=value of field on last closed constant B surface. $B_o$=value of field at center. Base=Initial trapping field intensity in kg. (kilagauss)

With such a plasma trapped in zone 39 the compression coil assembly 14 is energized with current switched by switching means 74 from a D.C. current source 78 to transmission lines 23, 24. The time constant L/R of the coils 16, 17 is selected to provide a rise time which is short compared to the ion-ion relaxation time but is long compared to the ion cyclotron period. Typical rise time of the order of 100 to about 500 microseconds and decay times of the order of 30 milliseconds to about 300 milliseconds may be used. Of course, with appropriate cooling and adequate power current sources longer containment field time constants may be used if commensurate stable plasma containment is attained. The maximum field strength to be attained is determined by the compression ratio necessary to provide a desired final density and temperature with the initial plasma provided as described above.

The magnetic compression field pattern created by the assembly 14 is similar to that produced by the Yin-Yang coil described in the aforesaid co-pending application of Post and Moir with magnetic field lines projected onto the median plane between sectors 16a, 16b or 17a, 17b as generally shown in FIG. 5 of the drawing. At full magnetic field strength the plasma in zone 39 is compressed into a centroidal body 81 simulant of the form shown in FIG. 3 but may vary in shape dependent on particular parameters of the compression coils 16 and 17. A usual final configuration of body 81 may be visualized as a spindle form body divided hemispherically with the halves rotated 90° and rejoined.

As disclosed in the aforesaid Post and Moir application the magnetic field pattern and filamentary approximation of the coil structure 14 can be represented by the term R, the outer radius of coils 16 and 17, $\phi$ the angle of arc occupied by each coil 16 or 17, h the height or distance between a median plane between the parallel arcuate sectors of said coils and the sectors, and the separation of the centers of the sectors, i.e., $\Delta_z$ along a Z axis corresponding to axis 25. The fields may be calculated using an analytic approximation or by using a code such as the "MAFCO" code, disclosed in Report No. UCRL–7744 of the University of California Radiation Laboratory. It may have a range of about 180° to about 270°. With appropriate variation of h and of $\Delta Z$ mirror ratios, i.e., ratios of magnetic field strength in outer regions of space 26 to central region 39 may be varied from about 1.5 to about 7.0. The field pattern for the trapping and gating coils may similarly be determined.

Further details of the invention are set forth in the following illustrative example.

TABLE II

Dimensions

| | |
|---|---|
| Conductors of coils 16 and 17 | ½ x 8" copper bar. |
| Conductor coils 31 and 36 | ¼" sq. multiple parallel. |
| Sector 16a, 16b, 17a, 17b curvature | 180°. |
| Sector 16a, 16b, 17a, 17b | 57½" wide (O.D.). |
| Sector 16 and 17 spacing | 30" axial to center line. |
| Sector 16a–16b, 17a–17b, spacing (2h) | 17⅝ inches. |
| Curved end 18, 19, 21, 22 projecting distance | 5¾". |
| Chamber section 41–42 overlap | 6". |
| Coils 31 and 36 arcuate sector | 120°. |

Trapping coil rise time 50–500 microseconds. Gating coil rise time about 10 to about 20 microseconds. Compression coil rise time about 100 to about 500 microseconds. Plasma energy about 1 kev. to about 5 kev.

While there has been described in the foregoing what may be considered to be preferred embodiments modifications therein may be made by those skilled in the art and it is intended to cover all such as fall within the scope of the appended claims.

What is claimed is:

1. A magnetic compression device for producing a high temperature plasma comprising:

Yin-Yang coil means compressing first and second generally C-shaped electromagnet coil sections intermeshed in a rotated mirror image relation and together defining a generally spherical central volume defining first and second spaces, respectively, extending axially therebetween and which communicate with said central volume;

plasma source means arranged to direct a beam of relatively cool plasma through the first one of said spaces axially into said central volume;

first arcuate rectangular electromagnet coil trapping means disposed exteriorly circumjacent the second space defined by the second Yin-Yang coil section for generating a magnetic field region effective to reflect plasma emerging from said central volume back thereinto; and second arcuate rectangular electromagnet gating coil means disposed exteriorly circumjacent the first space defined by the first Yin-Yang coil section for generating a magnetic field region effective to cut off flow of plasma from said plasma source and to reflect plasma back into said central volume;

said first and second electromagnetic trapping and gating coil means thereby comprising means for trapping a relatively low-density, low-temperature plasma in a containment zone within said central volume; and power supply means including switching means arranged to energize said first trapping coil and second gating coil means sequentially so as to trap said relatively cool plasma in said central volume and then to apply energizing current to said Yin-Yang coil to create a magnetic field for compressing said relatively cool plasma in said volume which is thereby densified and heated to a relatively high temperature.

2. A magnetic compression device as defined in claim 1 wherein the C-shaped Yin-Yang electromagnet coil sections encompass an angle in the range of about 180° to about 270°.

3. A magnetic compression device as defined in claim 2 wherein said plasma source produces a fusionable light nuclide plasma which is directed into said central volume defined by said electromagnetic coil sections.

4. A magnetic compression device as defined in claim 3 wherein the electromagnet coil sections have a rise time which is short as compared to the ion-ion relaxation time but which is long with respect to the ion cyclotron period so that adiabatic compression and heating of the plasma occurs.

5. A magnetic compression device as defined in claim 4 wherein an elongated energized electromagnet coil section are provided to encompass said plasma source means, the path of said plasma beam and said central volume to provide a magnetic guide field for directing said plasma into said central volume and to cooperate with the field of said trapping and gating coils to provide said low temperature containment zone.

6. A magnetic compression device as defined in claim 5 wherein there is provided vacuum vessel means including generally rectangular box-like vessel sections inserted through said electromagnet coil sections to intersect each other and enclose at least said containment zone and including at least one generally cylindrical section communicating with one of said rectangular box-like sections and extending to encompass said plasma source means and wherein said vessel means is provided with means for evacuating said vessel to below about $10^{-6}$ mm./Hg.

7. A magnetic compression device as defined in claim 6 wherein said trapping coil means has a rise time in the range of about 50 to about 500 microseconds and said gating coil means has a rise time of at least about 10 to about 20 microseconds.

8. A magnetic compression device as defined in claim 6 wherein said magnetic guide field has an intensity in the range of about 1000 to about 3000 gauss and said compression electromagnetic coil sections have a rise time in the range of about 100 to about 500 microseconds.

9. A magnetic compression device as defined in claim 8 wherein said plasma comprises a material selected from the group consisting of H, D, T, $He^3$ and mixtures thereof and wherein the trapped plasma has an energy in the range of about 1 kev. to about 5 kev.

References Cited
UNITED STATES PATENTS

| | | | |
|---|---|---|---|
| 3,156,622 | 11/1964 | Hill et al. | 176—7 |
| 3,290,219 | 12/1966 | Harwitz et al. | 176—3 |

REUBEN EPSTEIN, Primary Examiner

U.S. Cl. X.R.

176—7; 315—111